(No Model.)

A. R. NASH & J. SADLER.
AGRICULTURAL BOILER.

No. 284,884. Patented Sept. 11, 1883.

WITNESSES:
Fred G. Dieterich
Arthur L. Morsell

Allen R. Nash,
John Sadler,
INVENTORS,
By Louis Bagger & Co,
ATTORNEYS.

UNITED STATES PATENT OFFICE.

ALLEN R. NASH AND JOHN SADLER, OF LIME SPRING, IOWA.

AGRICULTURAL BOILER.

SPECIFICATION forming part of Letters Patent No. 284,884, dated September 11, 1883.

Application filed June 8, 1883. (No model.)

*To all whom it may concern:*

Be it known that we, ALLEN R. NASH and JOHN SADLER, both of Lime Spring, in the county of Howard and State of Iowa, have jointly invented certain new and useful Improvements in Agricultural Boilers; and we do hereby declare that the following is a full, clear, and exact description of the invention, which will enable others skilled in the art to which it appertains to make and use the same, reference being had to the accompanying drawings, which form a part of this specification, and in which—

Figure 1:
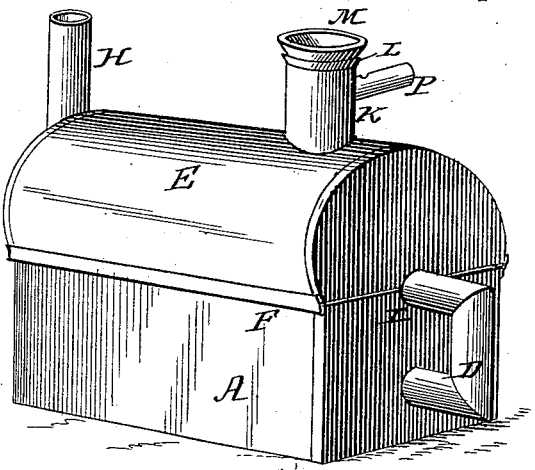
Figure 2:
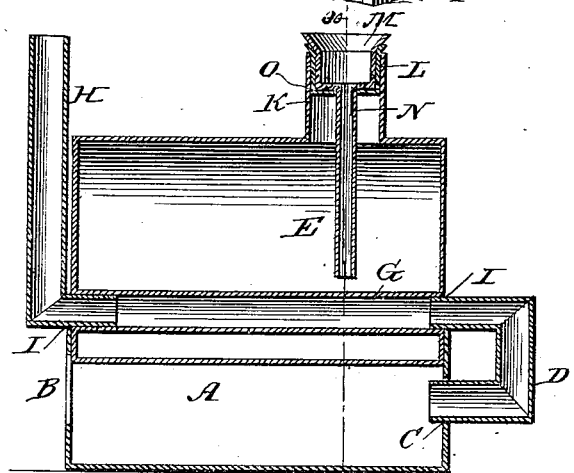
Figure 3:
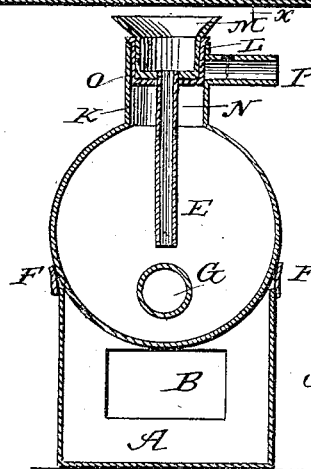

Figure 1 is a perspective view of our improved agricultural boiler. Fig. 2 is a longitudinal vertical section of the same; and Fig. 3 is a vertical cross-section through line $x$ $x$ in Fig. 2.

Similar letters of reference indicate corresponding parts in all the figures.

Our invention relates to agricultural boilers for boiling feed or water for the use of stock, and for other purposes; and it consists in the improved construction and combination of parts of a boiler of that class, as hereinafter more fully described and claimed.

In the accompanying drawings, A is the furnace, which is fed through a door, B, in the front end, while it has an opening, C, at the opposite end for the insertion of the removable smoke-flue D.

The boiler (shown at E) is of cylindrical shape, and adapted to fit with its lower part into the furnace A, upon which it is supported by side flanges, F F, parallel to each other, on opposite sides of the boiler.

G is the boiler-flue, which extends through the boiler from end to end, and is connected at one end to the bent smoke-flue D and at the other end to the smoke-stack H, both of which are removable to facilitate their being cleaned when desired. The top part of the furnace is recessed at opposite ends, as shown at I, to make room for the smoke-flue D and smoke-stack H, respectively.

In the top part of the boiler is a steam-dome, K, the upper part of which forms a removable receptacle, L, into which is fitted a removable funnel-shaped cap, M, provided with a downward-projecting tube, N, adapted to be inserted into a central aperture, O, in the bottom of the receptacle L. The steam-dome is provided on one side with the blow-off pipe P, into which a whistle or other suitable alarm may be inserted, adapted to be operated by the escaping steam.

The water or feed to be boiled is fed into the boiler through the funnel and its tube, which latter extends down to within about three-fourths of an inch of the boiler-flue. If, now, the water by accident should fall below the lower end of the funnel-tube, the steam will escape through the same, and if the steam-pressure in the boiler becomes too great it will raise the dome-receptacle and funnel, admitting steam to the blow-off pipe, which will give the alarm, and if the pressure should go beyond that point it will first blow the funnel out, and thereupon the dome-receptacle, when all danger of explosion ceases, the entire top of the dome being open and allowing a great volume of steam to escape.

Having thus described our improvement, we claim and desire to secure by Letters Patent of the United States—

1. The combination of a furnace having half-round notches or recesses in the top edges of its end pieces, and having a feed-door at one end and a flue-opening at the other end, a boiler having a horizontal flue, a U-shaped bent smoke-flue inserted into one end of the horizontal flue and into the flue-opening of the furnace, and a removable smoke-stack inserted into the other end of the horizontal flue, as and for the purpose shown and set forth.

2. The combination of a boiler having a cylindrical dome open at the top, and provided with an escape-pipe near its upper end, a cylindrical flanged receptacle fitting into the upper end of the dome, having a perforation in the center of its bottom, and covering, when inserted to its entire length, the aperture of the escape-flue, and a funnel having a cylindrical portion of its body fitting into the aforesaid receptacle, and having a tube extending through the perforation in the bottom of the receptacle down to a short distance from the flue, as and for the purpose shown and set forth.

3. The combination, with the boiler E, having steam drum or dome K, provided with the blow-off P, of the removable receptacle L, and funnel M, having tube N, substantially as and for the purpose shown and set forth.

In testimony that we claim the foregoing as our own we have hereunto affixed our signatures in presence of two witnesses.

ALLEN R. NASH.
JOHN SADLER.

Witnesses:
A. M. VAN LEUVEN,
C. C. HEWETT.